Figure 1:
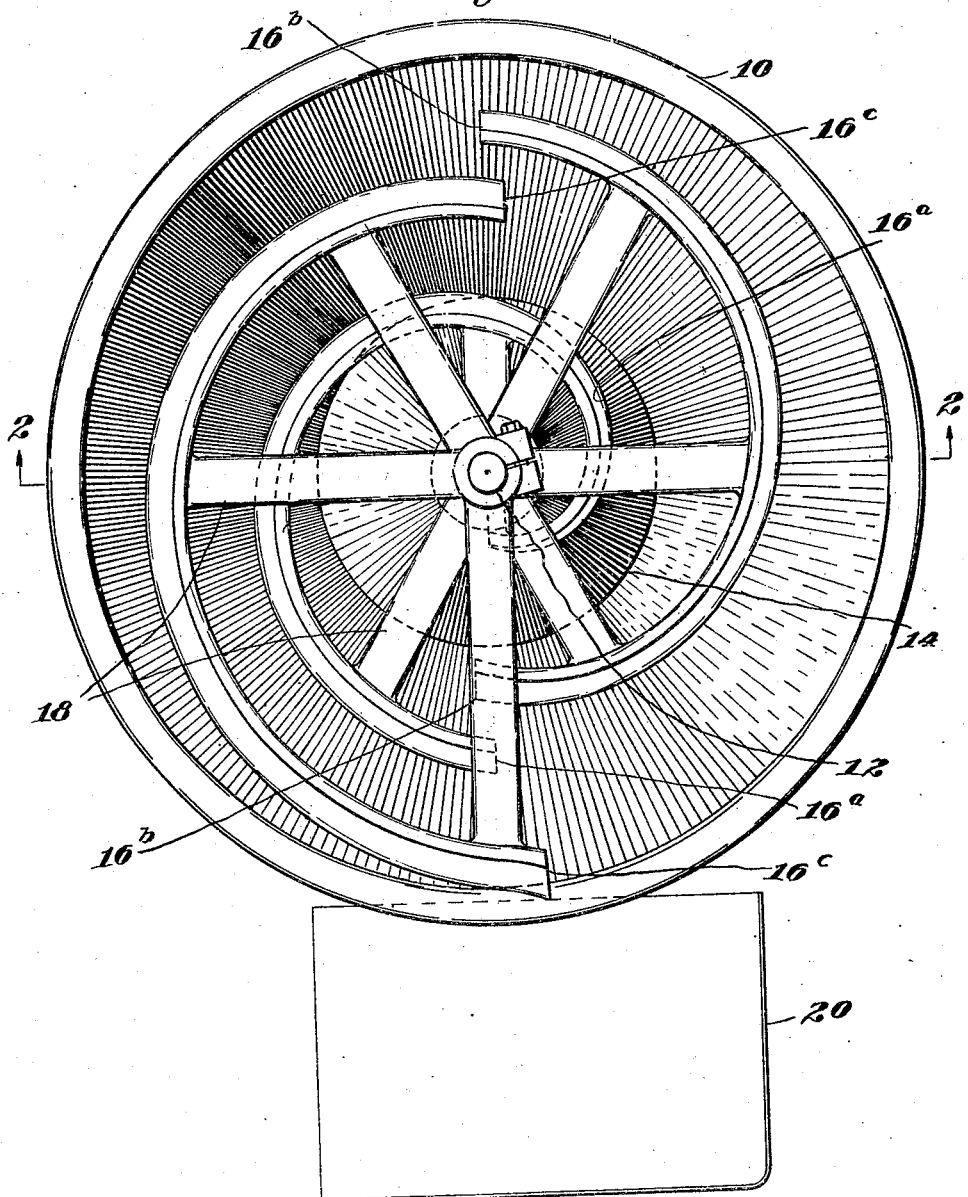

July 13, 1926.

G. H. PETRI 1,592,154

FORMING MACHINE

Filed Oct. 29, 1920    2 Sheets-Sheet 2

Inventor
Gunther H. Petri
By Mitchell, Chadwick + Kent
Attorneys.

Patented July 13, 1926.

1,592,154

UNITED STATES PATENT OFFICE.

GUNTHER H. PETRI, OF BOSTON, MASSACHUSETTS.

FORMING MACHINE.

Application filed October 29, 1920. Serial No. 420,462.

This invention relates to improvements in forming machines for plastic materials, such as dough, and more especially to that type of forming machines known as rounders. It has been found highly satisfactory to form balls of dough for bread and rolls mechanically by feeding divided masses of the material against the concave side of a conical molding table which revolves in proximity to a stationary trough dough race, the coaction of the table and race causing the mass of dough to travel along the race and gradually to assume a round form. In one specific arrangement which has been found successful the table is a frustum of an inverted hollow cone, and is rotatably mounted, the dough race being a trough stationarily mounted within the cone, over and close to its inner surface. The mass of dough settling down between the upstanding stationary trough wall and the upstanding moving table, which also constitutes a wall, is rolled along with its axis vertical or approximately so; and as the trough is set at an incline, while the travel of the table is in a horizontal direction and the pull of gravity is vertical, there is some gradual shifting of the material with respect to the axis of the rotating mass; but the compression and kneading effect is after all very much in the same direction through the mass, and the shape produced is pronouncedly ovoid.

It is an object of this invention to improve such apparatus so as to increase and perfect the kneading action on the dough; and to do this without enlarging or complicating the machine. In addition to the beneficial effect produced upon the dough itself a further advantage is attained by the better and less expensive process of fitting the race to the table because of the variation of setting permissible when arranged according to the present invention. In particular it is an object to make abrupt shifts of the axis of rotation, and to introduce definite percussion of the dough while it is being kneaded, simulating effectively the rolling in different directions, the changes of shape, and the pats administered by a skilled human operator in kneading by hand. These objects are accomplished by using a dough race divided into sections, whose continuity is interrupted while gradually climbing the interior of a conical revolving kneading table, of type heretofore known. The dough is rolled along the race in the usual manner until, at the end of a section, the dough sustains a fall of a few inches into another section of the race whose beginning is below, back of and to one side of the section from which the dough falls. By a series of such sections the dough is eventually brought to the upper edge of the table, but only after several of such droppings have occurred, in each of which the direction of the dough ball's axis was materially shifted, the mass itself pressed in a new direction, and incidentally given percussion, and the rolling started on a fresh axis, all of which results in a greater amount of kneading being given the dough than is provided in the machines using a continuous race.

It is intended that the patent shall cover by suitable expression in the appended claims, whatever features of patentable novelty exist in the invention disclosed.

Figure 2:
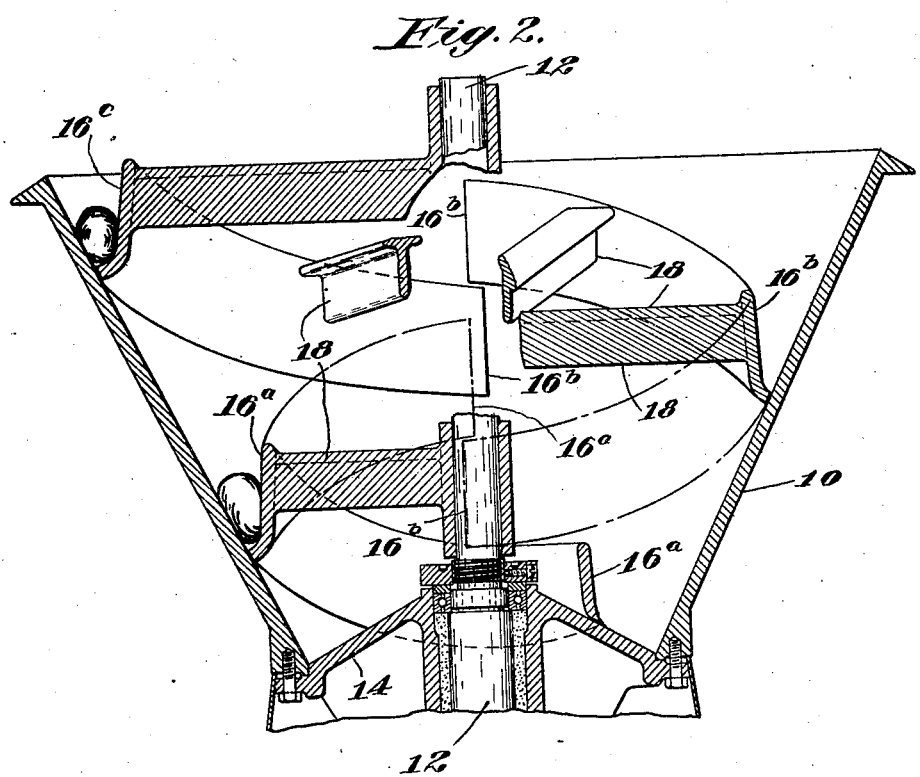

In the drawings,

Figure 1 is a plan of a conical bowl kneading table with a dough race embodying the invention; and Figure 2 is an elevation in section on line 2—2 of Figure 1, a portion of the supporting vertical standard and arms being cut away to bring out more clearly the relative positions of the disconnected sections of the dough race, the spiral location of parts of the dough race removed by the sectioning being indicated in dot and dash lines.

Referring to the drawings, a kneading table or bowl 10 is shown rotatably supported on the fixed vertical shaft or standard 12, about which it is rotated by any suitable driving mechanism (not shown). This table has the concave surface of a frustum of an inverted hollow cone. The lower central opening is closed by the convex side of a conical bottom 14 which revolves with the table substantially as one piece. Near its apex this conical bottom merges with an elongated sleeve extending downward about the fixed shaft 12. At the top of this sleeve is a ball race, washers and nuts, forming a relatively high bearing for the table, which, as shown, is higher than the bottom of the table, and higher than some parts of the top side of the table, that is the side which operates upon the dough. Below, at the end of the elongated sleeve which is broken away and not shown in the drawing, any form of suitable and well known bearing and driving means may be employed. The upward converging conical bottom permits the provision of a relatively high bearing of the table on the shaft, thus improving stability and eliminating any tendency of the table to wobble.

Mounted rigidly on the central stationary standard 12, are several successive sections of a dough race, lettered in the order of their action on the dough as 16ª, 16ᵇ and 16ᶜ. These sections are troughs of the usual configuration, having a substantially vertical face flared to a greater radius at the bottom to form in conjunction with the inside surface of the table, a somewhat U-shaped trough for the dough. Arms 18 extending radially inward from each dough race section are adapted to be clamped securely to standard 12 in position selected with reference to the proper adjustment of the bottom edge of each section to the table, and also with respect to each other. This independent support of each section not only enables them each to be set with their receiving and discharging ends in a certain relative position to be more particularly described hereafter, but also enables each section to be independently adjusted with respect to the bowl, whereby a better fit between the edge of the race and the face of the bowl is made possible. When the dough race is made in one integral piece, or when its sections are secured together, to form in fact a continuous trough, any unevenness or distortion of a single section affects the setting of the entire race, resulting in a distribution of the error throughout the whole. With the sections independently supported, each perfect one is set with exact nicety, and any, that may be somewhat untrue, can be adjusted to the position of best fit, without affecting the perfect setting of the others. The lowest section 16ª of the series begins close to the standard 12, progresses downward helically and spirally outward from it, over and close to the surface of the bottom 14, until its flared edge is close to the concave face of the kneading table, from which point the section continues spirally outward but helically upward in close relation to the table surface until it has progressed a distance, which in the specimen illustrated is about half way around the standard. There it abruptly terminates, with an open end. The next section 16ᵇ is positioned so that its beginning is a few inches below and back from the end of section 16ª, but in equally close relation to the table, being placed so as to catch the partially formed ball of dough as it drops from the first section 16ª. This second section 16ᵇ continues to wind upward and outward until it in turn has gone about one half way around when it also suddenly terminates. The third section 16ᶜ is fixed so that it may catch the ball of dough as it drops from the second section 16ᵇ, and guides the ball to the top of the table where it may be discharged from the machine onto any suitable receptacle such as a bench 20. It is manifest that by lessening the pitch of the sections, or by making them shorter, or by doing both, any desired number of drops may be administered to the dough and the degree of kneading increased. Beside the effects produced on the external skin and the arrangement of the material in the mass, there is a further benefit derived from dropping the dough from one section of the race to the other, which results in a better shaped ball. This is due to the fact that in falling the mass of dough is supported by a conical surface of the table and therefore rolls sideways as it descends, as will be clearly evident upon considering the plan view, Figure 1, thus turning partly over in falling into the succeeding section of the trough. In consequence, that axis of the mass, which was approximately upright, turns over laterally, and the rotation in the succeeding section proceeds about a fresh axis making a considerable angle with the former axis of rotation. This tends to equalize the action on all sides of the ball and give it a more spheroidal shape when it is discharged, as well as a surface of more homogeneous texture.

I claim as my invention:

1. A forming machine for plastic masses comprising a circular molding table having an upper surface set at such an angle from the vertical that it is adapted to sustain a substantial part of the weight of a mass resting against it combined with a dough race extending spirally and helically thereover; one of said parts being rotatory, thereby to roll a mass engaged between them; and the continuity of the said race being interrupted by a drop from one part of the race to the next at the place of interruption.

2. A forming machine for plastic masses comprising a circular molding table having an upper surface set at such an angle from the vertical that it is adapted to sustain a substantial part of the weight of a mass resting against it combined with a dough race extending spirally and helically thereover; one of said parts being rotatory, thereby to roll a mass engaged between them; said dough race being arranged in successive sections, each delivering to the next at an elevation above it; there being an underlying inclined support to give the mass lateral rotation in passing from one section to the next.

3. In a forming machine for plastic masses, a receptacle whose inner face is a surface of revolution with its elements oblique to the axis of revolution, said axis being vertical and said inner face of the receptacle being a molding surface, in combination with a dough race extending spirally and helically on said molding surface; one of said members being mounted rotatorily so that a plastic mass engaged between them is rolled along said dough race; said race having interruptions whereat it fails to support the mass, and said mass rolls toward the axis on the molding surface only.

4. In a machine of the class described, the combination of a base, a post rising therefrom, a rotatable bowl concentric with the post, and a stationary spiral trough member within and in cooperative relation with the bowl, said trough member being made up of a plurality of sections independently supported upon the post, the discharge end of each trough section being at a higher level than the inlet end of the next above trough section.

5. In a machine of the class described, the combination of a fixed post, a rotatable bowl concentric with the post, and a stationary spiral trough member within the bowl and in cooperative relation therewith, said trough member being made up of a plurality of sections, each section having substantially radial arms leading to a split sleeve embracing the post and provided with fastenings to clamp the sleeve upon the post, each trough section having its discharge end at a higher elevation than the inlet end of the next above trough section.

6. A forming machine for plastic material comprising a table in the form of a truncated hollow cone with its concave surface upward; a conical bottom having its convex surface projecting upward within said table and adapted for gravity to tend to move dough thereon toward said concave surface; and a dough race adapted to be moved relatively to the table, cooperating with the surface of said table.

7. A forming machine for plastic material comprising a table in the form of a truncated hollow cone with its concave surface upward; a conical bottom having its convex surface projecting upward within said table; and a dough race adapted to be moved relatively to the table, cooperating with the surfaces of said table and bottom.

8. A forming machine for plastic material comprising a table in the form of a truncated hollow cone with its concave surface upward; a conical bottom having its convex surface projecting upward within said table; and a dough race adapted to be moved relatively to the table, having its beginning near the axis of said table and curving spirally outward therefrom over and close to said convex surface to the concave surface, thence curving spirally and helically outward and upward along said concave surface to the top of said table.

Signed at Boston, Massachusetts this 26th day of October, 1920.

GUNTHER H. PETRI.